United States Patent [19]

Kremer et al.

[11] Patent Number: 4,514,288
[45] Date of Patent: Apr. 30, 1985

[54] ORE BENEFICIATION PROCESS

[75] Inventors: Ross A. Kremer, Ringoes; Stephen W. Saunders, Plainsboro, both of N.J.

[73] Assignee: Mobil Oil Corporation, New York, N.Y.

[21] Appl. No.: 541,765

[22] Filed: Oct. 13, 1983

[51] Int. Cl.³ ............................................. B03B 1/00
[52] U.S. Cl. ...................................... 209/5; 209/166; 210/907
[58] Field of Search ...................... 209/3, 4, 5, 9, 166, 209/167; 210/729, 907

[56] References Cited

U.S. PATENT DOCUMENTS

| | | | |
|---|---|---|---|
| 2,660,303 | 11/1953 | Haseman | 209/5 |
| 3,450,257 | 6/1969 | Cundy | 209/166 |
| 4,049,547 | 9/1977 | Hamer et al. | 210/907 |
| 4,194,969 | 3/1980 | Chung et al. | |
| 4,206,045 | 6/1980 | Wang et al. | |
| 4,224,149 | 9/1980 | Balcerski et al. | 210/907 |

Primary Examiner—Bernard Nozick
Attorney, Agent, or Firm—Alexander J. McKillop; Michael G. Gilman; Charles J. Speciale

[57] ABSTRACT

By dispersing a clay-containing mineral matrix in an aqueous solution of EDTA before washing or classifying the ore, one obtains a system in which the subsequently formed clays consolidate at an unexpectedly high rate and to a higher final density.

8 Claims, No Drawings

4,514,288

ORE BENEFICIATION PROCESS

BACKGROUND OF THE INVENTION

1. Field of the Invention

The invention relates to treatment of ores, particularly phosphate ore. More particularly, it relates to modifying the process of formation of dispersed clays (slimes) therein. Still more particularly, the invention relates to the modification of dispersed clay formation in an ore matrix, particularly in a phosphate ore matrix, by dispersing the matrix in a dilute aqueous solution of ethylendiaminetetraacetic acid (EDTA) prior to ore beneficiation, whereby the sedimentation and consolidation characteristics of these by-product clays is greatly improved.

2. Discussion of Prior Practices and Publications

The preferred phosphate matrix is found in Central Florida and in other places and occurs in large deposits averaging about 20 feet in thickness. Since the matrix deposit begins about 15 feet below the surface, recovery is by open pit methods.

In addition to the phosphate rock and silica, the matrix contains a substantial amount of clay, which is predominantly less than 1 micron in size. It is this clay that presents one of the substantially unsolved problems of the ore mining industry.

After the phosphate matrix is removed from the open pit by a dragline, or by other means, it is dropped into a sluice pit, where it is slurried with water and transported through pipelines to the beneficiation plant. During hydraulic slurrying, transporting and subsequent washing, screening and classification, the clay particles are dispersed in the water, producing the so-called phosphatic clay suspensions or slimes.

In the conventional phosphate beneficiation process, tremendous quantities of clay suspensions are formed, amounting to about 20–40% of the phosphate ore mined. When it is considered that these suspensions are formed as aqueous suspensions containing about 1–5% solids, one can readily appreciate the enormous quantities of water used. It is the disposal of the vast amounts of slimes generated and secondarily the recovery of phosphate values from slimes that present perhaps the most pressing problems that face the phosphate industry, and that have faced it for a long time.

Clay suspensions present a problem because they retain substantial amounts of their original water, even after years of settling. Not only does this result in an area having no bearing strength, but it also results in the waste of increasingly rare natural resources, water and land. In this regard, even after settling for many years, the suspensions settle to only about 20–25% by weight of solids and still are jelly-like in consistency. So, considering this, it is no wonder that there are such large areas near the phosphate producing areas of Florida that are virtually useless for any purpose.

Because of this, dams are necessary to retain the suspensions, and they must be continuously inspected and repaired. Such dams have been known to fail, and as a result to pollute the land, rivers and lakes. This is especially severe in the case of polluted waters because of the potentially lethal effects on fish and other life.

The industry has attempted over the years to eliminate the wasteful loss of phosphate values, water and land. Such efforts are so numerous that no purpose would be served by enumerating all of them, but a few will be mentioned as illustrations.

Attempts have been made to coagulate the clay suspensions by mechanical methods (e.g., U.S. Pat. No. 3,008,575) and chemical methods (e.g., U.S. Pat. No. 3,314,537), but such attempts have been made after the suspensions have formed. One U.S. Pat. No. (4,194,969) discloses a method for treating the ore matrix prior to classification. The patent discloses that certain water soluble metal salts, the metal being aluminum, calcium, magnesium or zirconium, can be added to the ore matrix to modify phosphatic clay formulation. It further discloses the addition of such salts to the ore matrix prior to screening, sizing and the like. However, none of these methods teach or suggest the present method, including the efforts disclosed in the preceeding three patents.

SUMMARY OF THE INVENTION

In accordance with the invention, there is provided a method for modifying the formation of clay suspensions, preferably phosphatic clay suspensions (slimes) during ore beneficiation, whereby the clays coagulate and consolidate more rapidly to a higher final clay density, which comprises adding to a matrix slurry of the ore, prior to washing or classification, a minor amount of ethylendiamenetetracetic acid of the formula $(HOOCCH_2)_2NCH_2CH_2N(CH_2COOH)_2$.

DESCRIPTION OF SPECIFIC EMBODIMENTS

As has already been mentioned, generally the problem of clay suspensions, and in particular phosphatic clay suspensions, is attacked after they have been formed. Applicants know of no references, other than U.S. Pat. No. 4,194,969, which relates to the chemical treatment of the suspensions prior to formation thereof.

It is an object of this invention to employ a method which substantially modifies formation of the suspension such that the solids therein will consolidate rapidly to a higher final clay density. The object is accomplished by adding EDTA to the ore matrix prior to the rigorous hydrotreatment that occurs prior to and during screening, sizing and the like.

We have found that the effective concentration of EDTA in solution will vary depending upon the particular ore treated. However, in general, we prefer to use from about 0.5 pound to about 10 pounds of EDTA per ton of ore, preferably from about 2 pounds to about 5 pounds, when the solids content is from about 1 to about 50% by weight. The stated concentration of EDTA is especially effective with phosphate ores.

The following will generally illustrate the plant-scale operation of the invention, using a Florida phosphate ore. It will be understood that the description is general only, since the typical recovery methods are well known, as is clear from U.S. Pat. No. 4,206,045, incorporated herein by reference.

After the overburden is removed, the ore matrix is mined, generally using a dragline, and is slurried with a dilute aqueous solution of EDTA using a high-pressure jet. The matrix slurry is moved to the beneficiation plant through a pipeline, where it first goes through the screening, washing, sizing and classification steps in which the water used may or may not contain EDTA. If EDTA is used at this stage, it may be present at the same or different concentration level employed in the slurry water. The phosphatic clays obtained from these steps are sent to a pond for settling. After classification, the phosphate-containing solid is fed to the rougher and amine flotation units from which concentrated phosphate rock is produced.

Optionally, the ore matrix can be transported from the mine on a conveyor belt and the slurry made with EDTA in the plant prior to the screening step.

Having described the invention in general terms, the following examples will serve to specifically illustrate it, with the understanding that they are illustrations only.

The Examples which follow are taken from work performed on samples obtained from the Florida phosphate fields. They illustrate the effectiveness of EDTA in modifying phosphatic clays to improve their sedimentation/consolidation characteristics.

EXAMPLE 1

A phosphate ore matrix was slurried at 40 wt.% solids with water in which was dissolved sufficient EDTA to give a concentration thereof of about 3 lb of EDTA per ton of dry matrix. The resulting slurry was subjected to high shear conditions, i.e., agitation for 20 minutes with a twin blade mixer at high speed. Phosphate clay suspensions were generated by screening the slurry through a 150 mesh screen, collecting the underflow and diluting it to 3.5 wt.% solids. The water used for both screening and dilution was untreated, i.e., no EDTA was added to it. The resulting clay slurry was then consolidated in a consolidometer under an effective stress of 0.21 psi.

EXAMPLE 2

This Example was run exactly like Example 1, except that the matrix slurry water was not treated with EDTA. Treatment of the matrix slurry water increased the clay consolidation rate by about 80% and increased the final clay density by about 1%.

We claim:

1. A method for modifying the formation of clay suspensions and phosphate ore beneficiation, whereby the clays coagulate and consolidate more rapidly to a higher final clay density, which comprises adding to a phosphate matrix slurry of the phosphate ore, prior to classification and froth flotation a minor amount of ethylenediaminetetraacetic acid of the formula $$(HOOCCH_2)_2NCH_2CH_2N(CH_2COOH)_2$$

followed by classification and forth flotation with recovery of phosphate.

2. The method of claim 1 wherein the ore matrix is slurried, at the mining site, with water containing the EDTA.

3. The method of claim 1 wherein the ore slurry is made just prior to the screening step, the slurry water containing the EDTA.

4. The method of claim 1 wherein the ore is a phosphate ore which was slurried to 40 wt.% solids with water in which is dissolved sufficient EDTA to give a concentration thereof of 3 pounds per ton of ore.

5. The method of claim 1 wherein the amount of EDTA is from about 0.5 pound to about 10 pounds per ton of ore.

6. The method of claim 5 wherein the amount of EDTA is from about 2 pounds to about 5 pounds per ton of ore.

7. The method of claim 1 wherein said phosphate ore is slurried to 40 wt.% solids with water in which is dissolved sufficient ethylenediaminetetraacetic acid to give a concentration thereof of from about 0.5 to about 10 pounds per ton of ore.

8. The method of claim 7 wherein the amount of ethylenediaminetetraacetic acid is from about 2 pounds to about 5 pounds per ton of ore.

* * * * *